(12) United States Patent
Kim et al.

(10) Patent No.: US 9,050,901 B2
(45) Date of Patent: Jun. 9, 2015

(54) ELECTRIC VEHICLE CHARGING APPARATUS, ELECTRIC VEHICLE CHARGING SYSTEM INCLUDING THE SAME, AND ELECTRIC VEHICLE CHARGING METHOD

(71) Applicant: LSIS CO., LTD., Anyang-si, Gyeonggi-do (KR)

(72) Inventors: Yeong Chan Kim, Seoul (KR); Chauhdary Sajjad Hussain, Seoul (KR)

(73) Assignee: LSIS Co., Ltd., Anyang-Si, Gyeonggi-Do (KR)

(*) Notice: Subject to any disclaimer, the term of this patent is extended or adjusted under 35 U.S.C. 154(b) by 370 days.

(21) Appl. No.: 13/631,734

(22) Filed: Sep. 28, 2012

(65) Prior Publication Data
US 2013/0082654 A1    Apr. 4, 2013

(30) Foreign Application Priority Data

Sep. 30, 2011    (KR) .................. 10-2011-0100194

(51) Int. Cl.
*H02J 7/00*    (2006.01)
*B60L 11/18*    (2006.01)

(52) U.S. Cl.
CPC .......... *B60L 11/1848* (2013.01); *Y02T 10/7005* (2013.01); *Y02T 90/16* (2013.01); *Y02T 90/163* (2013.01); *Y02T 90/168* (2013.01); *Y02T 90/169* (2013.01); *Y02T 90/14* (2013.01); *Y02T 90/128* (2013.01); *Y04S 30/12* (2013.01); *Y04S 30/14* (2013.01); *Y02T 90/121* (2013.01)

(58) Field of Classification Search
USPC ................................. 320/109, 137
See application file for complete search history.

(56) References Cited

U.S. PATENT DOCUMENTS 5,327,066 A    7/1994    Smith
(Continued)

FOREIGN PATENT DOCUMENTS

| JP | 2004-254444 | 9/2004 |
|---|---|---|
| JP | 2006-262570 | 9/2006 |

(Continued)

OTHER PUBLICATIONS

Japan Patent Office Application Serial No. 2012-217096, Office Action dated Nov. 11, 2013, 7 pages.

(Continued)

*Primary Examiner* — Sun Lin
(74) *Attorney, Agent, or Firm* — Lee, Hong, Degerman, Kang & Waimey (57) ABSTRACT

Provided is an electric vehicle charging apparatus, and more particularly, an electric vehicle charging apparatus that periodically transmits a consumed amount of power to a cost claim server, so as to claim a cost per unit time. The charging apparatus includes a charging certification unit receiving certification information of the electric vehicle, a power measurement unit generating power consumption information as a result obtained by calculating an amount of power consumed for charging the electric vehicle, and a communication unit transmitting the certification information to a certification server, and transmitting the power consumption information to a cost claim server.

17 Claims, 4 Drawing Sheets

(56) References Cited

U.S. PATENT DOCUMENTS

| | | | |
|---|---|---|---|
| 7,521,935 B2* | 4/2009 | Uchida | 324/426 |
| 8,548,659 B2* | 10/2013 | Tanaka | 701/22 |
| 8,683,236 B2* | 3/2014 | Ukita et al. | 713/300 |
| 8,725,338 B2* | 5/2014 | Tanaka | 701/22 |
| 2009/0062967 A1 | 3/2009 | Kressner et al. | |
| 2011/0037429 A1* | 2/2011 | DeBoer et al. | 320/109 |
| 2011/0185303 A1* | 7/2011 | Katagi et al. | 715/771 |
| 2011/0191265 A1 | 8/2011 | Lowenthal et al. | |

FOREIGN PATENT DOCUMENTS

| | | |
|---|---|---|
| JP | 2007-252117 | 9/2007 |
| JP | 2009-129384 | 6/2009 |
| JP | 2010178450 | 8/2010 |
| KR | 20110068562 | 6/2011 |

OTHER PUBLICATIONS

Korean Intellectual Property Office Application Serial No. 10-2011-0100194, Office Action dated May 30, 2013, 4 pages.
Korean Intellectual Property Office Application Serial No. 10-2011-0100194, Office Action dated Nov. 13, 2012, 5 pages.
Ecoroko, "Vehicle to Grid V2G" [online], retrieved from the Internet: <http://www.ecoroko/com/431>, Jun. 6, 2011, 2 pages.
Arcturas, "Future electric cars, accelerating the V2G (vehicle-to-grid) study" [online], retrieved from the Internet: <http://bizkhan.tistory.com/1948>, (retrieved Oct. 16, 2013), 4 pages.
The State Intellectual Property Office of the People's Republic of China Application Serial No. 201210365162.6, Office Action dated Apr. 24, 2014, 8 pages.
Japan Patent Office Application Serial No. 2012-217096, Office Action dated Jul. 30, 2014, 4 pages.

* cited by examiner

ELECTRIC VEHICLE CHARGING APPARATUS, ELECTRIC VEHICLE CHARGING SYSTEM INCLUDING THE SAME, AND ELECTRIC VEHICLE CHARGING METHOD

CROSS-REFERENCE TO RELATED APPLICATIONS

Pursuant to 35 U.S.C. §119(a), this application claims the benefit of earlier filing date and right of priority to Korean Patent Application No. 10-2011-0100194, filed on Sep. 30, 2011, the contents of which are hereby incorporated by reference herein in their entirety.

BACKGROUND

The present disclosure relates to an electric vehicle charging apparatus, and more particularly, to an electric vehicle charging apparatus that periodically transmits a consumed amount of power to a cost claim server, so as to claim a cost per unit time.

Petroleum energy used as main energy sources for hundreds of years is running low, and research is actively carried out on alternative energy sources for preventing air pollution and atmospheric change due to consumption of petroleum energy. Energy sources replacing petroleum energy, such as wind power, water power, and solar energy have already been commercialized in several fields. Also in the vehicle field, research is actively carried out on a vehicle using an alternative energy source as a fuel in order to achieve market dominance. Along with this trend, electric vehicles using electricity as an energy source to partially replace petroleum energy have been developed and commercialized.

Accordingly, the demand for electric vehicle charging apparatuses and systems will grow. However, when electric vehicle charging apparatuses and systems, it takes more time to supply a fuel to an electric vehicle, that is, to charge an electric vehicle than to supply gasoline to a typical vehicle. For example, when a typical vehicle is filled with gasoline at a gas station, the filling of the vehicle takes tens of seconds to several minutes, and a driver may pay by cash or credit card. However, when an electric vehicle is charged at a charging apparatus or system, charging of a battery of the electric vehicle takes tens of minutes to several hours, and it may be difficult for a driver to stay at the charging apparatus or system during the charging of the battery. Thus, in this case, there is an issue how a charging cost is claimed.

Hence, electric vehicle charging apparatuses and systems using an improved cost claim method are needed.

SUMMARY

Embodiments provide an electric vehicle charging apparatus using an improved cost claim method, or a system including the electric vehicle charging apparatus.

In one embodiment, a charging apparatus for charging an electric vehicle includes: a charging certification unit receiving certification information of the electric vehicle; a power measurement unit generating power consumption information as a result obtained by calculating an amount of power consumed for charging the electric vehicle; and a communication unit transmitting the certification information to a certification server, and transmitting the power consumption information to a cost claim server.

The power consumption information may include the amount of power consumed for charging the electric vehicle, and information about time consumed for charging the electric vehicle. The information about time consumed for charging the electric vehicle may include at least one of information about time when use of power for charging the electric vehicle is started, and information about time when the use of power for charging the electric vehicle is ended. The communication unit may transmit the power consumption information to the cost claim server periodically at every unit time.

When the communication unit transmits first power consumption information to the cost claim server, the power measurement unit may generate second power consumption information, wherein the first power consumption information includes an amount of power consumed for charging the electric vehicle for first unit time, and the second power consumption information includes an amount of power consumed for charging the electric vehicle for second unit time.

When the communication unit transmits first power consumption information to the cost claim server, the power measurement unit may generate second power consumption information, wherein the first power consumption information includes an amount of power supplied from the electric vehicle to a power grid located at an upper level for first unit time, and the second power consumption information includes an amount of power supplied from the electric vehicle to the power grid for second unit time.

The certification information may include at least one of an identification (ID) of the electric vehicle and an ID of a user of the charging apparatus.

In another embodiment, a method of charging an electric vehicle includes: calculating an amount of power consumed for charging the electric vehicle, to generate power consumption information; and transmitting the power consumption information to a cost claim server.

The method may further include: receiving certification information of the electric vehicle; and transmitting the certification information to a certification server.

In another embodiment, a charging system for charging an electric vehicle includes: a charging apparatus that generates power consumption information as a result obtained by calculating an amount of power consumed for charging the electric vehicle; and a cost claim server that determines a charging cost corresponding to the power consumption information transmitted from the charging apparatus.

The charging apparatus may transmit the power consumption information generated at every unit time, to the cost claim server.

When the charging apparatus transmits first power consumption information to the cost claim server, the charging apparatus may generate second power consumption information, wherein the first power consumption information includes an amount of power consumed for charging the electric vehicle for first unit time, and the second power consumption information includes an amount of power consumed for charging the electric vehicle for second unit time.

The charging system may further include a certification server that receives certification information transmitted from the charging apparatus to perform a certification process, and transmits a result of the certification process to the charging apparatus.

The details of one or more embodiments are set forth in the accompanying drawings and the description below. Other features will be apparent from the description and drawings, and from the claims.

DETAILED DESCRIPTION OF THE EMBODIMENTS

Exemplary embodiments have been disclosed herein, and they are used and are to be interpreted in a generic and descriptive sense only and not for purpose of limitation. In addition, it will be understood by those skilled in the art that various changes in form and details may be made therein without departing from the spirit and scope of the invention. In the specification, the meaning of "include" and "comprise" specifies a technical configuration but does not exclude other technical configurations.

Reference will now be made in detail to embodiments of the present disclosure, examples of which are illustrated in the accompanying drawings.

Figure 1:
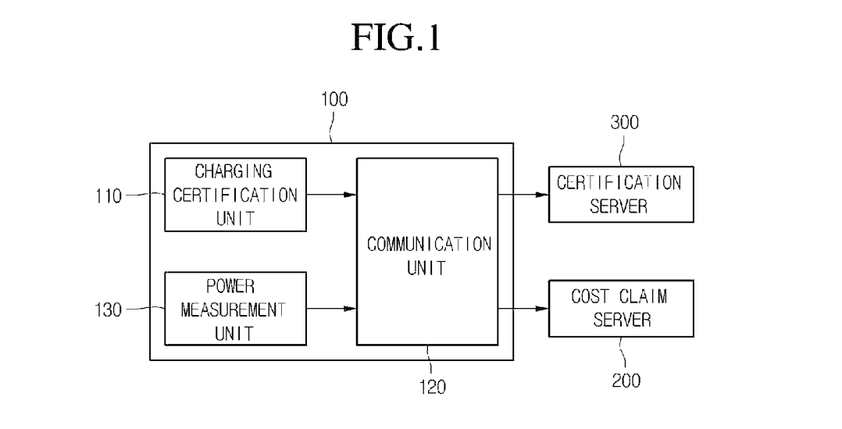
FIG. 1 is a block diagram illustrating an electric vehicle charging apparatus according to an embodiment.

FIG. 1 is a block diagram illustrating an electric vehicle charging apparatus according to an embodiment.

A charging apparatus 100 according to the current embodiment may include: a charging certification unit 110 receiving certification information of a user or electric vehicle to certify the user or electric vehicle; a power measurement unit 130 that generates power consumption information of electric power (hereinafter, referred to as power) consumed to charge the electric vehicle; and a communication unit 120 transmitting the certification information of the user or electric vehicle to a certification server, and transmitting the power consumption information to a cost claim server located at an upper level, to claim a cost corresponding to the charging of the electric vehicle.

The charging certification unit 110 is configured to identify an electric vehicle or user (driver) to charge the electric vehicle, and is used in a first certification operation of an electric vehicle charging process. For example, identification information for identifying an electric vehicle or user may be an electric vehicle identification (ID) or a user ID.

The charging certification unit 110 may confirm whether an electric vehicle or user is certified, and then, allow the electric vehicle or user to use the charging apparatus 100 or a charging system. Such a certification process may be used not only to allow an electric vehicle or user to use a charging apparatus or a charging system, but also to claim a usage cost of a charging apparatus later.

The charging certification unit 110 receives certification information from a radio frequency identification (RFID) card of an electric vehicle or user, and transmits the certification information of a certification server, thereby performing a certification process.

The power measurement unit 130 is used to measure or calculate an amount of power consumed to charge a battery of an electric vehicle after the certification of the electric vehicle or a user is confirmed. A method of measuring power consumption is not specifically limited. For example, the method of measuring power consumption may be similar to that used in a typical watt-hour meter.

The power measurement unit 130 may generate power consumption information by calculating or measuring power consumption for certain time, according to a cost claiming method to be described later. The power consumption information may include power consumption and power usage time (start/end time).

When power consumption is measured or calculated for certain time, the power consumption is periodically calculated, and results of the calculation are classified to generate individual pieces of power consumption information. For example, power consumption information of power consumption at time T=T1, (that is, power consumed between T0 and T1, referred to as a first power consumption hereinafter) may be generated, and power consumption information of power consumption at time T=T2, (that is, power consumed between T1 and T2, referred to as a second power consumption hereinafter) may be generated.

The generated power consumption information may be transmitted to a cost claim server 200 located at an upper level, by the communication unit 120 to be described later.

In other words, an amount of power consumed in a charging process can be divided into a plurality of values (n values), and costs corresponding to the n values can be individually claimed, instead of claiming a cost corresponding to an accumulated amount of power consumed in a charging process as in the related art. Thus, instead of downloading a cost claim table (or a cost claim data table) from a cost claim server at an upper level to determine a cost to be claimed by an electric vehicle charging apparatus, separated pieces of power consumption information can be sequentially transmitted to a cost claim server at an upper level, and costs corresponding to the separated pieces of power consumption information can be determined at the cost claim server. The determined costs may be claimed periodically (e.g., one time a month in a deferred payment system) from a certified user or an owner of an electric vehicle.

In such a cost claim method, since a cost per unit time is calculated at a cost claim server, even in the case that an electric vehicle is temporarily disconnected from an electric vehicle charging apparatus, or a charging process is restarted, a cost to be claimed can be efficiently calculated. In addition, since the cost claim server at an upper level calculates a cost to be claimed, it is unnecessary for the electric vehicle charging apparatus to calculate a cost to be claimed. In addition, a charging apparatus verification process for determining a cost to be claimed, which is carried out in advance to fabricate, produce, supply, or distribute electric vehicle charging apparatuses, is unnecessary.

According to the above cost claim method, a user charging an electric vehicle at a charging apparatus or system can stop the charging of the electric vehicle at any time and move to a destination without paying a cost.

The communication unit 120 may transmit certification information of a user or electric vehicle from the charging certification unit 110 to the certification server. In addition, to claim a charging cost of an electric vehicle after the certification of an electric vehicle or user is confirmed, the communication unit 120 may transmit power consumption information to the cost claim server 200 located at the upper level.

As described above, since power consumption information of power consumed during charging can be periodically generated at certain time or unit time, the communication unit 120 can also transmit the power consumption information periodically at certain time or unit time.

Figure 2:
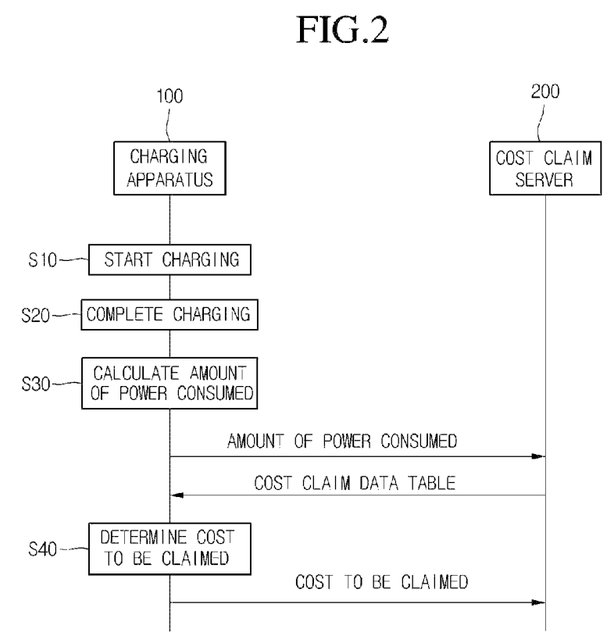
FIG. 2 is a flowchart illustrating an electric vehicle charging method according to another embodiment.
Figure 3:
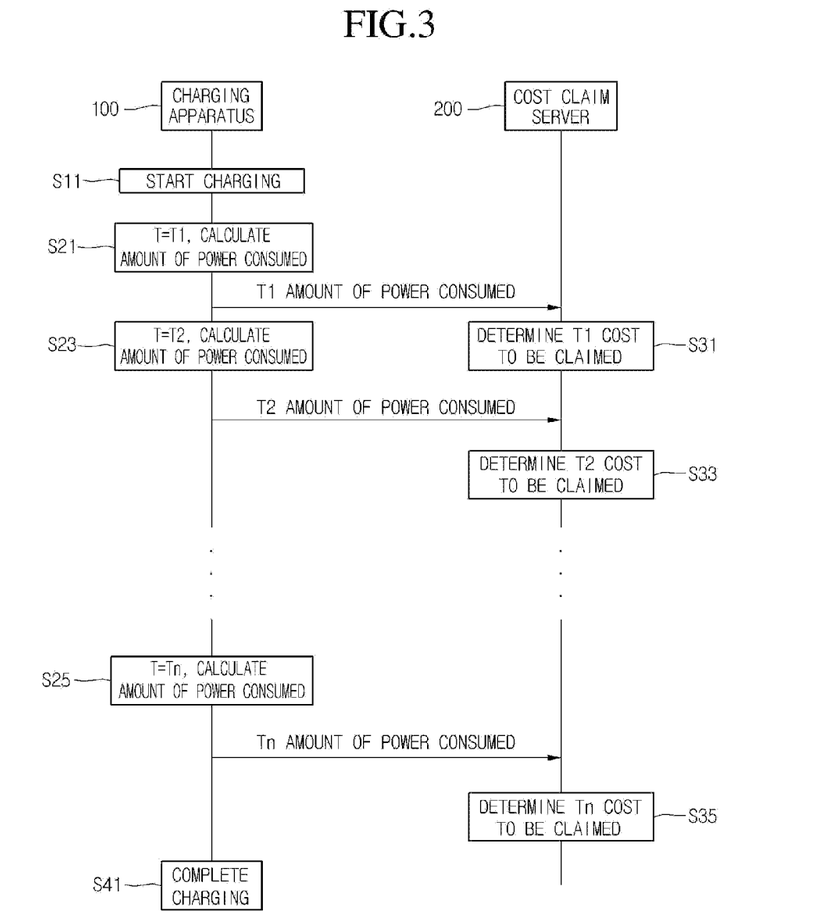
FIG. 3 is a flowchart illustrating an electric vehicle charging method according to another embodiment.

Referring to FIGS. 2 and 3, an electric vehicle charging method according to an embodiment will now be described. For convenience in description, an operation of certifying a user or electric vehicle will be omitted. Thus, only the charging apparatus 100 and the cost claim server 200 are illustrated in FIGS. 2 and 3.

FIG. 2 is a flowchart illustrating an electric vehicle charging method according to an embodiment.

Particularly, FIG. 2 is a flowchart illustrating a charging method of an electric vehicle charging apparatus according to an embodiment. After certification of an electric vehicle or user is confirmed (not shown), the charging apparatus 100 may start a charging process in operation S10. After that, the charging process may be completed in operation S20, and the charging apparatus 100 may calculate an amount of power consumed in the charging process in operation S30.

A differential payment system according to time and usage amount may be applied to electric power, unlike a petroleum fuel such as gasoline or diesel oil. Thus, unlike filling of a vehicle with gasoline or diesel oil, a charging cost of an electric vehicle can be calculated after the electric vehicle is charged.

After the charging apparatus 100 calculates the amount of power consumed in the charging process, power consumption information corresponding to the calculated amount of power may be transmitted to the cost claim server 200. Then, certification information of the user or electric vehicle and a cost claim data table (a cost claim table) according to the power consumption information may be transmitted to the charging apparatus 100 by the cost claim server 200.

Then, in operation S40, the charging apparatus 100 may determine a cost to be claimed, based on the received cost claim data table. In addition, information corresponding to the cost to be claimed may be transmitted to the cost claim server 200, and thus, can be managed together with a user ID or an electric vehicle ID.

To sum up, in the charging method of FIG. 2, the charging apparatus 100 may measure or calculate an amount of power consumed, and download a cost claim data table directly from the cost claim server 200, to determine a cost to be claimed.

FIG. 3 is a flowchart illustrating an electric vehicle charging method according to an embodiment.

Particularly, FIG. 3 is a flowchart illustrating a charging method of an electric vehicle charging apparatus according to an embodiment. After certification of an electric vehicle or user is confirmed (not shown), the charging apparatus 100 may start a charging process in operation S11. After that, in operation S21, a first power consumption as an amount of power consumed for charging an electric vehicle may be calculated or measured at time T=T1 by the charging apparatus 100, so as to generate first power consumption information including the first power consumption. The charging apparatus 100 may transmit the first power consumption information generated at time T=T1, to the cost claim server 200. Then, in operation S31, the cost claim server 200 may calculate and determine a power consumption at time T=T1 (between T0 and T1), based on a cost claim data table (a cost claim table).

In addition, in operation S23, a second power consumption as an amount of power consumed for charging the electric vehicle may be calculated or measured at time T=T2 by the charging apparatus 100, so as to generate second power consumption information including the second power consumption. As such, the charging apparatus 100 may generate power consumption information including an amount of power consumed at every unit time (e.g., between T1 and T2), and transmit the generated power consumption information to the cost claim server 200. In addition, the cost claim server 200 may calculate and determine a cost to be claimed, at every unit time.

After that, when the charging of the electric vehicle is ended, or a charging connector is disconnected from the electric vehicle, the charging method may be completed in operation S41.

As such, while charging an electric vehicle, the charging apparatus 100 may transmit power consumption information to the cost claim server 200 at every unit time or periodically. Accordingly, a cost corresponding to an amount of power consumed to charge the electric vehicle may be calculated at every unit time or periodically by the cost claim server 200. Thus, it is unnecessary for the charging apparatus 100 to determine a cost to be claimed, thereby simplifying a verification process for fabricating, producing, or supplying the charging apparatus 100. In addition, in the above charging method, the stability of a cost claim process can be more effectively ensured from an arbitrary error or accident that may occur during a charging process than in a typical method of calculating a cost after a charging process. In addition, it is unnecessary for the charging apparatus 100 to download a cost claim data table from the cost claim server 200, thus simplifying a charging process.

Figure 4:
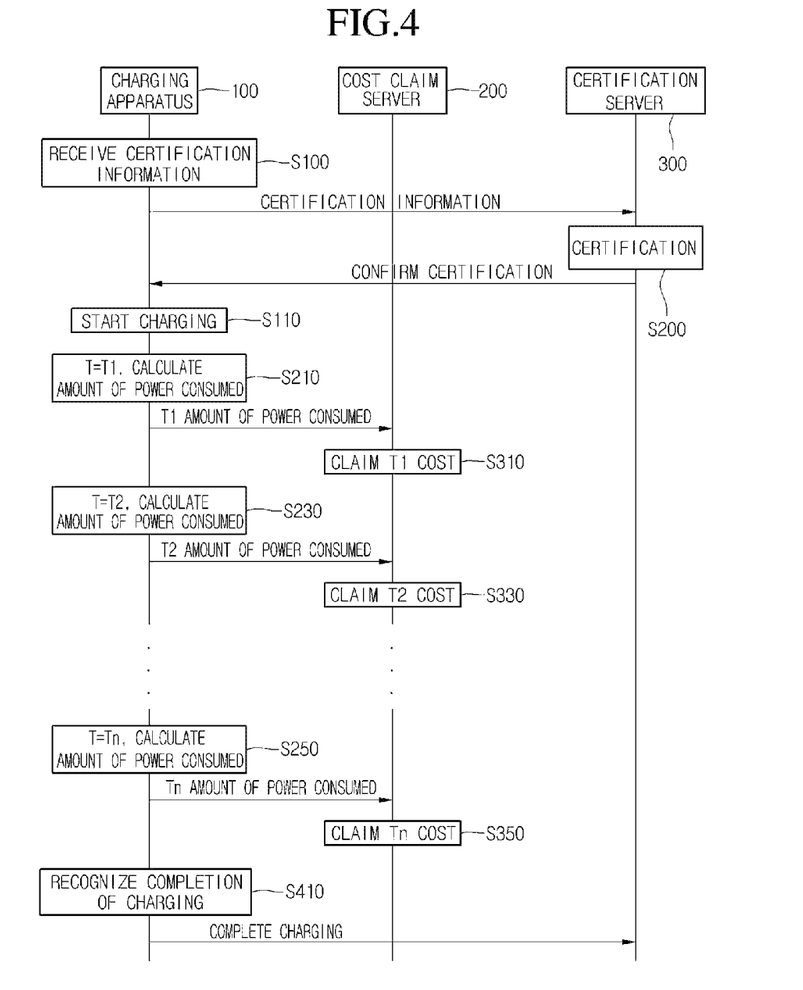
FIG. 4 is a flowchart illustrating an operation of an electric vehicle charging system according to another embodiment.

FIG. 4 is a flowchart illustrating an operation of an electric vehicle charging system according to an embodiment.

In operation S100, the charging apparatus 100 may receive certification information from a user (or a driver). To this end, the user may touch an ID card such as an RFID card to the charging certification unit 110 of the charging apparatus 100, or the charging certification unit 110 may recognize a member such as a smart card or RFID card attached to an electric vehicle, by using an antenna (not shown). The charging apparatus 100 may transmit the received certification information to a certification server 300 through the cost claim server 200, but the present disclosure is not limited thereto.

In operation S200, the certification server 300 may perform a certification process by processing the certification information. During the certification process, it is confirmed whether the user or electric vehicle has a certified ID, which may be used as information for claiming a cost. For example, a cost corresponding to power consumed for charging may be claimed from a certified user or electric vehicle.

When the certification process is completed, the certification server 300 may transmit a certification confirmation message to the charging apparatus 100 through the cost claim server 200, but the present disclosure is not limited thereto. Accordingly, the charging apparatus 100 may start a charging process.

In operation S210, the charging apparatus 100 may generate power consumption information by measuring or calculating, at every unit time or periodically, an amount of power consumed during the charging process, and may transmit the power consumption information to the cost claim server 200. Then, in operation S310, the cost claim server 200 may claim a usage cost corresponding to the amount of power measured at every unit time or periodically.

As such, a power consumption can be measured at every unit time or periodically, and a cost corresponding to the power consumption can be claimed at every unit time or periodically. At this point, the power consumption and the usage cost are determined only within a measuring or calculating period, and thus, are not accumulated. Thus, when n units of time are consumed during a charging process, a calculation or measurement process and a cost claim process may be performed n times. In other words, a calculation or measurement process and a cost claim process can be performed at every unit time during a charging process, unlike the related art in which a calculation or measurement process and a cost claim process are performed once during a charging process.

When the charging process is completed, the charging apparatus 100 may recognize the completion of the charging process in operation S410, and transmit a recognized result to the cost claim server 200 or the certification server 300.

Although the charging of an electric vehicle is described with reference to FIGS. 1 to 3, power may be transmitted from an electric vehicle to a power grid located at an upper level. In other words, power may be supplied from an electric vehicle to a power grid located at an upper level.

Thus, power can be supplied to a smart grid (a power grid) from an electric vehicle charged for managing power load. Even in this case, an amount of power supplied from an electric vehicle to a smart grid may be subtracted at the cost claim server 200 of the charging apparatus or system according to the embodiment, thereby efficiently determining a cost to be claimed.

According to an embodiment, an electric vehicle charging apparatus measures or calculates only an amount of power used for charging/discharging at every unit time, without using a cost claim table, thus continuously charging an electric vehicle.

In addition, the functions of parts constituting an entire charging infrastructure are easily discriminated. In addition, when the charging infrastructure is operated, the electric vehicle charging apparatus transmits only a charge power consumption to an upper level, without using a cost claim table. Thus, it is unnecessary to perform a verification process on each charging apparatus to determine a charging cost to be claimed.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A charging apparatus for charging an electric vehicle, comprising:
    a charging certification unit receiving certification information of the electric vehicle;
    a power measurement unit generating power consumption information as a result obtained by calculating an amount of power consumed for charging the electric vehicle; and
    a communication unit transmitting the certification information to a certification server, and transmitting the power consumption information to a cost claim server,
    wherein when the communication unit transmits first power consumption information to the cost claim server, the power measurement unit generates second power consumption information,
    wherein the first power consumption information comprises an amount of power supplied from the electric vehicle to a power grid located at an upper level for first unit time, and the second power consumption information comprises an amount of power supplied from the electric vehicle to the power grid for second unit time.

2. The charging apparatus according to claim 1, wherein the power consumption information comprises the amount of power consumed for charging the electric vehicle, and information about time consumed for charging the electric vehicle.

3. The charging apparatus according to claim 2, wherein the information about time consumed for charging the electric vehicle comprises at least one of information about time when use of power for charging the electric vehicle is started, and information about time when the use of power for charging the electric vehicle is ended.

4. The charging apparatus according to claim 1, wherein the communication unit transmits the power consumption information to the cost claim server at every unit time.

5. The charging apparatus according to claim 1, wherein when the communication unit transmits first power consumption information to the cost claim server, the power measurement unit generates second power consumption information,
    wherein the first power consumption information comprises an amount of power consumed for charging the electric vehicle for first unit time, and the second power consumption information comprises an amount of power consumed for charging the electric vehicle for second unit time.

6. The charging apparatus according to claim 1, wherein the certification information comprises at least one of an identification (ID) of the electric vehicle and an ID of a user of the charging apparatus.

7. A method of charging an electric vehicle, comprising:
    calculating an amount of power consumed for charging the electric vehicle, to generate power consumption information; and
    transmitting the power consumption information to a cost claim server,
    wherein the generating of the power consumption information corresponds to generating second power consumption information when first power consumption information is transmitted to the cost claim server,
    wherein the first power consumption information comprises an amount of power supplied from the electric vehicle to a power grid located at an upper level for first unit time, and the second power consumption information comprises an amount of power supplied from the electric vehicle to the power grid for second unit time.

8. The method according to claim 7, wherein the power consumption information comprises the amount of power consumed for charging the electric vehicle, and information about time consumed for charging the electric vehicle.

9. The method according to claim 8, wherein the information about time consumed for charging the electric vehicle comprises at least one of information about time when use of power for charging the electric vehicle is started, and information about time when the use of power for charging the electric vehicle is ended.

10. The method according to claim 7, wherein the transmitting of the power consumption information to the cost claim server comprises transmitting the power consumption information to the cost claim server at every unit time.

11. The method according to claim 7, wherein the generating of the power consumption information corresponds to generating second power consumption information when first power consumption information is transmitted to the cost claim server,
    wherein the first power consumption information comprises an amount of power consumed for charging the electric vehicle for first unit time, and the second power consumption information comprises an amount of power consumed for charging the electric vehicle for second unit time.

12. The method according to claim 7, further comprising:
    receiving certification information of the electric vehicle; and
    transmitting the certification information to a certification server.

13. The method according to claim 12, wherein the certification information comprises at least one of an identification (ID) of the electric vehicle and an ID of a user charging the electric vehicle.

14. A charging system for charging an electric vehicle, comprising:
- a charging apparatus that generates power consumption information as a result obtained by calculating an amount of power consumed for charging the electric vehicle; and
- a cost claim server that determines a charging cost corresponding to the power consumption information transmitted from the charging apparatus,
- wherein, when the charging apparatus transmits first power consumption information to the cost claim server, the charging apparatus generates second power consumption information,
- wherein the first power consumption information comprises at least one of an amount of power consumed for charging the electric vehicle for first unit time, and an amount of power supplied from the electric vehicle to a power grid located at an upper level for the first unit time, and
- wherein the second power consumption information comprises at least one of an amount of power consumed for charging the electric vehicle for second unit time, and an amount of power supplied from the electric vehicle to the power grid for the second unit time.

15. The charging system according to claim 14, wherein the charging apparatus transmits the power consumption information generated at every unit time, to the cost claim server.

16. The charging system according to claim 14, further comprising a certification server that receives certification information transmitted from the charging apparatus to perform a certification process, and transmits a result of the certification process to the charging apparatus.

17. The charging system according to claim 16, wherein the certification information comprises at least one of an identification (ID) of the electric vehicle and an ID of a user of the charging apparatus.

* * * * *